United States Patent
Hüger et al.

(10) Patent No.: US 11,738,740 B2
(45) Date of Patent: Aug. 29, 2023

(54) METHOD FOR PARKING A TRANSPORTATION VEHICLE IN A PARKING SPACE AND TRANSPORTATION VEHICLE WITH A CONTROL UNIT FOR CARRYING OUT THE METHOD

(71) Applicant: VOLKSWAGEN AKTIENGESELLSCHAFT, Wolfsburg (DE)

(72) Inventors: Philipp Hüger, Rühen (DE); Sascha Ziebart, Wettmershagen Calberlah (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/357,608

(22) Filed: Mar. 19, 2019

(65) Prior Publication Data
US 2019/0283738 A1 Sep. 19, 2019

(30) Foreign Application Priority Data
Mar. 19, 2018 (DE) ...................... 10 2018 204 134.2

(51) Int. Cl.
*B60W 30/06* (2006.01)
*B62D 15/02* (2006.01)
*G06V 20/56* (2022.01)

(52) U.S. Cl.
CPC ......... *B60W 30/06* (2013.01); *B62D 15/0285* (2013.01); *G06V 20/588* (2022.01); *B60W 2555/60* (2020.02)

(58) Field of Classification Search
CPC .. B60W 30/06; B60W 2555/60; B60W 40/02; B60W 50/14; B60W 2050/009;
(Continued)

(56) References Cited

U.S. PATENT DOCUMENTS 10,442,465 B2 * 10/2019 Dhome ............... G05D 1/0257
10,875,576 B2   12/2020 Derendarz et al.
(Continued)

FOREIGN PATENT DOCUMENTS

CN     102310857 A      1/2012
DE     102007002261 A1  8/2008
(Continued)

OTHER PUBLICATIONS

Office Action for Chinese Patent Application No. 201910206886.8; dated Dec. 28, 2021.

*Primary Examiner* — Frederick M Brushaber
(74) *Attorney, Agent, or Firm* — BARNES & THORNBURG, LLP (57) ABSTRACT

A transportation vehicle with a control unit and a method for unparking a transportation vehicle from a parking space, wherein the control unit controls the transportation vehicle at least partly autonomously, wherein the method provides data relating to a current parking situation; determines possible target positionings of the transportation vehicle based on the provided data; determines a probability with which the respective target positioning corresponds to a desired target positioning of a user of the transportation vehicle while taking into account the provided data; orders the target positionings in a ranking according to the probability, and provides the ranking.

16 Claims, 7 Drawing Sheets

(58) Field of Classification Search
CPC ........ B60W 2050/146; B60W 2556/50; B62D 15/0285; G06K 9/00798; G06V 20/588; B60K 35/00; G08G 1/168; B60Y 2300/06
See application file for complete search history.

(56) References Cited

U.S. PATENT DOCUMENTS

| | | | |
|---|---|---|---|
| 10,889,323 B2 | 1/2021 | Derendarz et al. | |
| 2011/0231081 A1 | 9/2011 | Suzuki et al. | |
| 2012/0191284 A1* | 7/2012 | Fehse | B62D 15/0275 701/23 |
| 2014/0379258 A1* | 12/2014 | Beaurepaire | G01C 21/34 701/533 |
| 2015/0039211 A1* | 2/2015 | Stefan | G08G 1/144 701/117 |
| 2015/0088360 A1 | 3/2015 | Bonnet et al. | |
| 2016/0075331 A1* | 3/2016 | Tomozawa | B62D 15/0285 701/41 |
| 2016/0078766 A1* | 3/2016 | Kiyokawa | G08G 1/143 340/932.2 |
| 2016/0240082 A1* | 8/2016 | Mielenz | B62D 15/027 |
| 2017/0225678 A1* | 8/2017 | Bariant | G01S 15/931 |
| 2017/0229020 A1* | 8/2017 | Colella | B60W 10/20 |
| 2017/0351267 A1* | 12/2017 | Mielenz | B60W 30/06 |
| 2018/0229720 A1* | 8/2018 | Benmimoun | G05D 1/0044 |
| 2019/0039604 A1* | 2/2019 | Auracher | G05D 1/0225 |
| 2019/0193725 A1* | 6/2019 | Suzuki | G05D 1/0011 |
| 2019/0225211 A1* | 7/2019 | Hause | G06K 9/00825 |
| 2019/0233009 A1* | 8/2019 | Joos | B62D 15/0285 |
| 2020/0055514 A1* | 2/2020 | Tsuge | B60W 30/095 |
| 2020/0062243 A1* | 2/2020 | Perez Barrera | G05D 1/028 |
| 2020/0307559 A1* | 10/2020 | Göricke | B60W 10/20 |
| 2020/0398829 A1* | 12/2020 | Kasai | G08G 1/147 |

FOREIGN PATENT DOCUMENTS

| | | | | |
|---|---|---|---|---|
| DE | 102007058092 A1 * | 6/2009 | ......... | G01C 21/3469 |
| DE | 102010030208 A1 | 12/2011 | | |
| DE | 102012008858 A1 | 11/2012 | | |
| DE | 102011107974 A1 | 1/2013 | | |
| DE | 102011109492 A1 | 2/2013 | | |
| DE | 102013019830 A1 | 5/2015 | | |
| DE | 102013020699 A1 | 5/2015 | | |
| DE | 102014206901 A1 | 10/2015 | | |
| DE | 102015210118 A1 | 12/2016 | | |
| DE | 102016211180 A1 | 3/2017 | | |
| EP | 1468893 A2 * | 10/2004 | ......... | B62D 15/0285 |
| EP | 1908656 A1 * | 4/2008 | ............... | B60T 7/12 |
| EP | 2011701 A1 * | 1/2009 | ........... | B62D 15/028 |
| EP | 3462389 A1 * | 4/2019 | | |
| GB | 2453850 A * | 4/2009 | ......... | B62D 15/028 |
| GB | 2481324 A | 12/2011 | | |
| WO | WO-2007122861 A1 * | 11/2007 | ........... | B62D 15/027 |
| WO | 2008055567 A1 | 5/2008 | | |
| WO | 2011151045 A1 | 12/2011 | | |
| WO | 2017041927 A1 | 3/2017 | | |

\* cited by examiner

|    | 20 | 21 | 22 | 23 | 24 | 25 | 26 | 27 |
|----|----|----|----|----|----|----|----|----|
| 31 | X  | X  | X  | X  | X  | X  | X  | X  |
| 32 |    | X  |    | X  |    | X  |    | X  |
| 33 | X  |    | X  |    | X  |    | X  |    |
| 34 | X  | X  |    |    | X  | X  |    |    |
| 35 | X  | X  | X  | X  | X  | X  | X  | X  |
| 36 |    | X  |    |    |    | X  |    |    |
| 37 | X  |    | X  |    | X  |    | X  |    |

Fig.7 ically suitable for METHOD FOR PARKING A
TRANSPORTATION VEHICLE IN A
PARKING SPACE AND TRANSPORTATION
VEHICLE WITH A CONTROL UNIT FOR
CARRYING OUT THE METHOD

PRIORITY CLAIM

This patent application claims priority to German Patent Application No. 10 2018 204 134.2, filed 19 Mar. 2018, the disclosure of which is incorporated herein by reference in its entirety.

SUMMARY

Illustrative embodiments provide a method for unparking a transportation vehicle from a parking space and a transportation vehicle comprising a control unit carries out the method.

BRIEF DESCRIPTION OF THE DRAWINGS

Exemplary embodiments are described below. In the figures.

DETAILED DESCRIPTION

During automatic unparking of a transportation vehicle out of a transverse parking space using a corresponding parking aid assistant, often a plurality of target positionings for the transportation vehicle following the unparking are possible. If he activates automatic unparking of the transportation vehicle out of the parking space, a user of the transportation vehicle must therefore specify the desired target positioning of the transportation vehicle following the unparking. This is usually carried out using a corresponding position selection in a mobile telephone app that is displayed to the user on a display of a mobile telephone.

A method for maneuvering a transportation vehicle in an environment is known from DE 10 2011 107 974 A1. In the context of this method, first a reference maneuvering process is carried out in the environment in a learning mode of the transportation vehicle, which is stored and based on which at least semi-autonomously conducted repeated maneuvering processes in the same environment are possible. A parking or unparking process stored in the context of such a reference maneuvering process can then be carried out autonomously by the transportation vehicle again and again.

A method for positioning a transportation vehicle during an automatic parking process is known from DE 10 2013 019 830 A1. With the unparking process the transportation vehicle is driven autonomously on an unparking trajectory. The starting and ending of the unparking process are carried out using an external mobile control device operated by a user. Here the user decides about an optimal boarding position into the transportation vehicle. In the context of the method, after ending the unparking process the transportation vehicle is then automatically driven to the desired boarding position and is handed over to the user of the transportation vehicle there.

WO 2011/151045 A1 describes a method and a device for selecting a parking assistance function from a predetermined number of parking assistance functions of a parking steering assistant, wherein the parking assistance functions are arranged in two groups, depending on whether they comprise functions relating to parking or unparking of the transportation vehicle. A choice between the two groups of functions is made as a function of the state of the ignition switch and a path travelled by the transportation vehicle, whereby the method automatically differentiates between parking functions and unparking functions.

DE 10 2011 109 492 A1 shows a driver assistance device for a transportation vehicle for assisting in traversing narrow lanes. By detecting the data of a route that has been traversed (trajectory) from wheel sensors and steering angle sensors and recording route data, ultimately actuation of the transportation vehicle can be carried out based on the recorded route data. A check is now carried out as to whether the transportation vehicle is in an environment with road areas with limited navigation options and in such a case the recording of a trajectory is proposed to the driver or this is carried out automatically.

Disclosed embodiments provide a solution with which automatic unparking of a transportation vehicle can be carried out rapidly for a user of the transportation vehicle.

This is achieved by a method for unparking a transportation vehicle from a parking space and a transportation vehicle with a control unit for carrying out such a method.

The disclosed method for unparking a transportation vehicle from a parking space is designed for a transportation vehicle comprising a control unit that is designed to control the transportation vehicle at least partly autonomously. The disclosed method includes the following operations: first providing data relating to a current parking situation, determining possible target positionings of the transportation vehicle based on the provided data and determining a probability of the respective target positioning while taking into account the provided data corresponding to a target positioning desired by a user of the transportation vehicle. Then the target positionings are ranked in accordance with the probability thereof and the ranking is provided. If only one target positioning has been determined as a possible target positioning, control unit actuated unparking of the transportation vehicle is carried out along an unparking route leading to the target positioning and based on predetermined criteria.

The disclosed method is thus designed to assist a user of a transportation vehicle, whose transportation vehicle has already been parked on a parking space, during unparking from the parking space. The method is generally suitable for a transportation vehicle that can be controlled, accelerated and/or braked using a suitable control unit such that at least partly autonomous operation of the transportation vehicle is possible. The disclosed method is based on storing predetermined data describing the parking of the transportation vehicle in the transportation vehicle. While taking into account the data, possible target positions are determined with the associated target orientation of the transportation vehicle, i.e., possible target positionings are determined that the transportation vehicle could adopt after unparking out of the parking space. A probability value is then assigned to each of the target positionings determined in this way. The probability value, which is determined based on the data relating to the current parking situation, indicates the probability of the corresponding target positioning corresponding to target positioning desired by the user. A target positioning that corresponds with a high probability to such a target positioning desired by the user of the transportation vehicle is assessed with a correspondingly high probability value, whereas a target positioning that is rather unexpected is assessed with a significantly lower probability value. The individual target positionings are then arranged in order according to the probability value thereof. This series of target positionings is provided to the user of the transportation vehicle. If only one target positioning is determined as a probable target positioning while taking into account a possible desired target positioning of the user and the provided data, autonomous unparking of the transportation vehicle is carried out to the target positioning. The autonomous unparking is actuated by the control unit of the transportation vehicle and is carried out along a predetermined route, the so-called unparking route. When determining the unparking route, provided and predetermined prerequisites for the unparking route are taken into account, which are stored in the transportation vehicle as criteria.

If, for example, a transportation vehicle, which is designed for at least partly autonomous driving and comprises a corresponding control unit, is parked in the forward direction on a transverse parking space, the transportation vehicle can be unparked at least partly autonomously using the disclosed method. In the context of the corresponding method for unparking the transportation vehicle from the parking space, first different data relating to the current parking situation are taken into account. The data are, for example, the parking orientation, i.e., whether the transportation vehicle was parked forwards or backwards, a starting positioning of the transportation vehicle from which the transportation vehicle was parked previously on the parking space or information about the direction of traffic on the road adjacent to the parking space. While taking into account the provided data, the probability is then determined, with which the respective target positionings correspond to a target positioning desired by a user of the transportation vehicle, the so-called desired target positioning. The individual target positionings are then ordered in accordance with the determined probability in a series and the series is provided. In this case, for example, it is taken into account that it is more probable that a driver of the transportation vehicle wants to continue in the same direction from which he has come before parking, compared with the probability of a desired turnaround of the transportation vehicle and continuing opposite to the arrival driving direction.

If only one target positioning was determined as a possible target positioning, for example, because of obstacles in the surroundings of the parking space, because the determined driving directions after unparking the transportation vehicle are not possible, unparking the transportation vehicle along a determined unparking route leading to the determined target positioning is carried out controlled by the control device and based on predetermined criteria. Once the target positioning is reached, the transportation vehicle can again be handed over to the user of the transportation vehicle, so that the user can continue to drive in the desired direction with the transportation vehicle.

With the disclosed method, rapid unparking of the transportation vehicle is thus possible by automatic control. With this, complex determination of the target positioning of the transportation vehicle is not necessary, for example, using a corresponding selection on a display of a mobile telephone of the user of the transportation vehicle, to get the transportation vehicle to unpark autonomously in certain parking situations using the method. Moreover, due to determining the probabilities of the individual possible destination positionings, particularly unparking of a transportation vehicle from a parking space is possible, because, for example, the target positionings that are not possible because of the prevailing traffic direction on a lane adjacent to the parking space can be assessed with a probability of zero. As a result, it can be ensured that the impermissible target positionings are not proposed to the user of the transportation vehicle.

It is provided that when determining the probability at least the following data relating to the current parking situation are taken into account: A transportation vehicle orientation of the parked transportation vehicle in relation to a lane, a starting positioning from which the transportation vehicle was previously parked on the parking space and a traffic direction on the lane adjacent to the parking space. The data relating to the current parking situation thus contain information about whether the transportation vehicle was parked forwards or backwards on the parking space, because the transportation vehicle orientation is indicated. In addition, the starting orientation and the starting position of the transportation vehicle before the parking are known as a starting positioning. The starting positioning thus contains information about the direction from which the transportation vehicle was parked. The starting orientation can either lie to the left or right of the parking space. The starting position again contains the information about whether the transportation vehicle has driven from the lane side or from the opposite lane side onto the parking space. Moreover, it is taken into account whether left or right traffic prevails, i.e., it is the country version of the traffic direction that is typically stored in the transportation vehicle that is taken into account.

Determining the transportation vehicle orientation of the parked transportation vehicle in relation to the lane can, for example, be determined using odometry. Odometry refers to a method of estimating the position and orientation of a mobile system, such as, for example, a transportation vehicle, using the data of the propulsion system thereof. Wheel driven systems use the number of wheel revolutions for this. The transportation vehicle thus comprises, for example, an odometer to be able to determine whether the transportation vehicle has parked forwards or backwards into the parking space. The information is then stored in the memory unit of the transportation vehicle and can be called up and taken into account in the context of the method for unparking the transportation vehicle from the parking space.

While taking into account the data relating to the current parking situation, in the case of unparking out of a transverse parking space a total of eight possible target positionings of the transportation vehicle are determined. The eight possibilities differ in a direction of the unparking, i.e., in whether the transportation vehicle drives to the left or right when exiting the parking space, the unparking distance, i.e., whether the transportation vehicle has the target position thereof on the lane side or on the opposite lane side, and in the parking orientation-dependent unparking direction, i.e., whether it is unparked forwards or backwards.

When determining the probability it is thus, for example, taken into account that a transportation vehicle was parked forwards onto the parking space and for this has approached from the left in relation to the parking space on the lane side of the parking space. In this example, in addition the right side of the road is stored as a traffic direction, thus right traffic on the road adjacent to the parking space is also valid. Thus, determining the probability is based on the information regarding the direction in which the transportation vehicle was driven to the parking space, whereby information about possible onward travel is included in a known way. For example, the transportation vehicle can then be driven on in the same direction as previously or it can change direction and travel to the left on the opposite lane, i.e., on the opposite lane side, back in the direction of travel from which it came. Using the data relating to the current parking situation, which are detected by the sensor units and/or are stored in the memory unit of the transportation vehicle, a particularly rapid determination of the probabilities of the individual possible target positionings of the transportation vehicle is therefore enabled.

In a disclosed embodiment, it is provided that the data relating to the current parking situation are provided using transportation vehicle surroundings data that are currently detected by sensor units of the transportation vehicle and/or are stored in a memory unit of the transportation vehicle. The data relating to the current parking situation thus describe the surroundings of the transportation vehicle that has been parked on a parking space. The data can be actively detected by corresponding sensors of the transportation vehicle. On the other hand, it is also possible that the data have already been sensed by the sensors of the transportation vehicle during the parking process and stored in a corresponding memory unit of the transportation vehicle. Using the sensor unit of the transportation vehicle it is possible to detect obstacles in the surroundings of the parking space, but also in the vicinity of the lane or road adjacent to the parking space, and to take these into account when determining the possible target positioning of the transportation vehicle.

The data relating to the current parking situation can, for example, be provided by image generating cameras, radar units or lidar (Light Detection and Ranging) systems. The sensor units can be provided in the front region, in the rear region and on the sides of the transportation vehicle, for example, as cameras integrated in the side mirrors of the transportation vehicle. If individual sensors of the sensors are limited in the detection range thereof by parking the transportation vehicle on the parking space, for example, by walls limiting the parking space, it can be useful to access sensor data stored in the memory unit of the transportation vehicle during the parking process of the transportation vehicle in addition to or as an alternative to currently detected sensor data. Using the data relating to the current parking situation, possible target positions of the transportation vehicle following the unparking can thus be detected, because the data provide detailed information about the surroundings of the transportation vehicle. This assists unparking of the transportation vehicle from the parking space that is beneficial for the user of the transportation vehicle.

If the parking space of the transportation vehicle is in an infrastructure facility, such as, for example, a car park, then in addition a transmission to the transportation vehicle of data relating to the current parking situation that are provided by corresponding sensors of the infrastructure facility can be carried out via a communications connection between a communications unit of the infrastructure unit and a communications unit of the transportation vehicle. This makes it possible, for example, that the transportation vehicle can also be provided with data relating to the surroundings of the transportation vehicle recorded by corresponding cameras of the car park, whereby the method for unparking a transportation vehicle from a parking space in an infrastructure facility can be beneficial.

In a further disclosed embodiment, it is provided that when determining the probability, provided predetermined driving route criteria are taken into account as data relating to the current parking situation, which contain information about a destination of the transportation vehicle following the unparking and which are provided by at least one of the following systems: a navigation system of the transportation vehicle and a digital calendar of the user of the transportation vehicle.

In addition to the already mentioned data relating to the current parking situation, which are specified by the parking process and the traffic direction, further data, such as a destination are stored, using which the desired target positioning of the transportation vehicle can be determined, whereby ultimately the probability of the respective target positionings can be determined to correspond to the desired target positioning of the user. The destination of the transportation vehicle can be stored in a navigation system of the transportation vehicle, in which the next planned destination has already been stored. Furthermore, it is possible that a digital calendar of the user of the transportation vehicle data about upcoming appointments with corresponding location information is connected to a corresponding communications interface of the transportation vehicle and the information relating to the upcoming appointments is transmitted to the transportation vehicle. Using the calendar data, an upcoming destination of the transportation vehicle can also be identified and can be taken into account in the context of the method when determining the probabilities of individual target positionings. Due to taking into account the provided driving route criteria, it is thus possible that the target positioning is identified with high probability as the most probable target positioning, which also corresponds to the desired target positioning of the user of the transportation vehicle.

In addition, the destinations that are approached often and again and again in defined time windows can be stored in the memory unit of the transportation vehicle. For example, this enables a target positioning that in the case of desired automatic unparking in the afternoon of a working day leads in the direction of a driving route from a place of work of the user to their residence to be given a high probability. The target positioning, which corresponds to the user's way home in terms of position and orientation, may, for example, be assessed as the target positioning with the highest probability at typical travel times for the route, for example, on working days between 16:00 and 18:00, because as a rule it corresponds to the user's desired target positioning based on the data stored in the memory unit for these times.

In a further disclosed embodiment, it is provided that the predetermined criteria taken into account for determining the unparking route include at least one of the following criteria: A minimal number of movement and/or steering operations to reach the target positioning, a minimum distance travelled until reaching the target positioning, and leaving a minimum amount of free space in front of a driver's door of the transportation vehicle. After the respective probability of the individual target positionings have been determined and the probability values have been arranged in a series, in principle a respective unparking route can be determined for each of the target positionings. During determination of the unparking route, however, further criteria are taken into account. On the one hand, the unparking route should be short and enable a rapid departure. For this reason, the unparking route is chosen that requires a minimum number of movement and/or steering operations to reach the desired target position. In addition, it is stored as a criterion that overall a short distance between the parking space and the target position is to be travelled. As a result the selected unparking route can be travelled rapidly and also energy efficiently, because detours and complex steering and movement maneuvers are avoided. Furthermore, the unparking route is determined such that a user of the transportation vehicle has sufficient space at the target position to open the driver's door of the transportation vehicle and to enter the transportation vehicle. In addition to this leaving of a minimum amount of free space for a driver's door, it can also be stored as a criterion that a minimum amount of free space is to be left in front of other doors of the transportation vehicle, for example, the passenger door. The unparking process itself is thus made in the context of the method in terms of the energy consumption of the transportation vehicle, the wear on components of the transportation vehicle and the comfort of the user when entering the transportation vehicle after the unparking.

In a further disclosed embodiment, it is provided that providing the ranking is carried out by a display of at least one possible target positioning on a mobile telephone of the user of the transportation vehicle and/or on a display surface in the interior of the transportation vehicle. The ranking of the target positionings that is determined by using the probabilities while taking into account the provided data is thus visually displayed for a user of the transportation vehicle. The display can be carried out on a user's mobile telephone, for example, in a mobile telephone app that is provided for this. In addition or alternatively, a display on a display surface designed for this in the interior of the transportation vehicle is also possible. If the transportation vehicle can be actuated fully autonomously, the display on a mobile telephone is suitable, because then the user of the transportation vehicle can be outside the transportation vehicle and can activate the unparking of the transportation vehicle from there. In the case of partly autonomous unparking of the transportation vehicle by a corresponding unparking assistant, the display of the ranking of the target positioning on a corresponding display surface in the interior of the transportation vehicle is appropriate, because the user of the transportation vehicle remains in the interior of the transportation vehicle in this situation when activating the unparking of the transportation vehicle from the parking space using the method. The described display of the ranking thus provides a user-friendly and as a result ultimately conveniently usable method for a user of the transportation vehicle for unparking a transportation vehicle from a parking space.

In a further disclosed embodiment, it is provided that, if a plurality of target positionings have been determined as possible target positionings, the ranking is displayed as a list of all possible target positionings, wherein the list starts with the target positioning with the highest probability and possibly a target orientation of the transportation vehicle corresponding to the starting orientation of the transportation vehicle before parking on the parking space, and the user is requested to manually select the desired target positioning from the displayed list, whereupon the transportation vehicle, actuated by the control unit, is unparked along the route leading to the selected target positioning and based on the predetermined unparking route.

Thus if a plurality of target positionings has been determined as possible target positionings and thus as probable target positionings while taking into account a target positioning desired by the user of the transportation vehicle, a target positioning is thus not automatically selected and unparking of the transportation vehicle is not carried out along an unparking route leading to the selected target positioning. The possible target positionings are instead first displayed to the user of the transportation vehicle, and this occurs on the display of the user's mobile telephone and/or on the display surface in the interior of the transportation vehicle. The destination arrangements, which have been ordered in a ranking in accordance with the probability thereof and provided, are output to the user as a list in this case. The list starts with the target positioning having the highest probability and, if this is possible due to the starting positioning and the traffic direction on the road adjacent to the parking space, comprises a target orientation the transportation vehicle that corresponds to the starting orientation before parking on the parking space. The target positioning may be displayed, in accordance with which the user of the transportation vehicle can continue to drive in the same driving direction and on the same lane as before the parking process of the transportation vehicle. From the list displayed to the user of the transportation vehicle, the user can either manually select the first target positioning determined as the most probable target positioning or a different target positioning from the list with a lower probability. Then the transportation vehicle is controlled to the selected target positioning in accordance with the corresponding unparking route.

When considering the list of target positionings, the user of the transportation vehicle first sees the target positioning that is classified as relevant in the context of the method. If he also actually wants the target positioning, he can select it by a manual confirmation of the first element of the list. This selection can for example, be carried out by a corresponding keystroke, an actuation action on a touch-sensitive display surface or a predetermined voice command. However, if the user of the transportation vehicle wants an alternative target positioning, he can seek and select the target positioning in the list, because all determined possible target positionings are displayed in the list. This thus enables an easily operated selection of the desired target positionings in the context of unparking the transportation vehicle from the parking space.

In a further disclosed embodiment, it is provided that, if a plurality of target positionings have been determined as possible target positionings, only the target positioning with the highest probability and possibly a target orientation of the transportation vehicle that corresponds to a starting orientation of the transportation vehicle before parking on the parking space is displayed to the user and the user is than requested to manually select the desired target positioning, whereupon the transportation vehicle, controlled by the control unit, is unparked along the unparking route leading to the selected target positioning and defined based on the predetermined criteria. With this display option, only the target positioning is displayed that corresponds to the user's desired target positioning with the highest probability and that possibly comprises the same target orientation that the transportation vehicle already exhibited before parking on the parking space. The user of the transportation vehicle can drive on from the target orientation and target position in the direction of travel in which he was travelling before parking.

The target positioning that was determined as a probable target positioning is thus displayed as a single target positioning to the user of the transportation vehicle on his display.

If, for example, the transportation vehicle approached a transverse parking space from the left on the lane side before the parking process, unparking back to the starting positioning is proposed to the driver as a single target positioning. The driver can then drive on in the direction of travel in which he was controlling the transportation vehicle before parking. This also enables the user of the method for unparking a transportation vehicle from a parking space rapidly operated selection of a target position for the transportation vehicle, because the most probable target positioning is displayed.

In a further disclosed embodiment, it is provided that the display of the further target positionings with low probabilities is carried out manually by selecting a corresponding element on the display surface, whereupon the user can manually choose between all possible scenarios. Since only the one target positioning with the highest probability, and possibly a target orientation of the transportation vehicle corresponding to the starting orientation of the transportation vehicle before parking on the parking space, is displayed up to this time, the user can additionally cause that the other destination arrangements, which however correspond to lower probabilities of the user's desired target positioning, can also be displayed and chosen by selecting a corresponding operating element on the selected display surface. Even with the display versions with which only the most relevant target positioning of the user is displayed, the user can thus ultimately choose between all determined probable target positionings. In this case, the listing of the further possible target positionings may be carried out in list form, re-ordered according to the probability thereof. The user can therefore also select and determine his desired target positioning of the transportation vehicle with the display versions.

According to the disclosure, in addition a transportation vehicle is provided that comprises a control unit that is designed to control the transportation vehicle at least partly autonomously. The transportation vehicle itself is designed to carry out the method described above for unparking a transportation vehicle from a parking space. The transportation vehicle can also be autonomously unparked in the case of only one possible target positioning and the control thereof can be handed back to the user of the transportation vehicle at the target positioning.

The disclosure also includes developments of the disclosed method, which comprise features as have already been described in connection with the developments of the disclosed transportation vehicle. For this reason, the corresponding developments of the disclosed method are not described once again here.

With the exemplary embodiments, the described components of the embodiments are each individual features of the disclosure that are to be considered to be mutually independent, each of which also develops the disclosure mutually independently and is thereby to be viewed as a component of the disclosure individually or in a different combination from the combination shown. Furthermore, the described embodiments can also be added to by further features from the already described features of the disclosure.

In the figures, functionally identical elements are each provided with the same reference characters.

Figure 1:
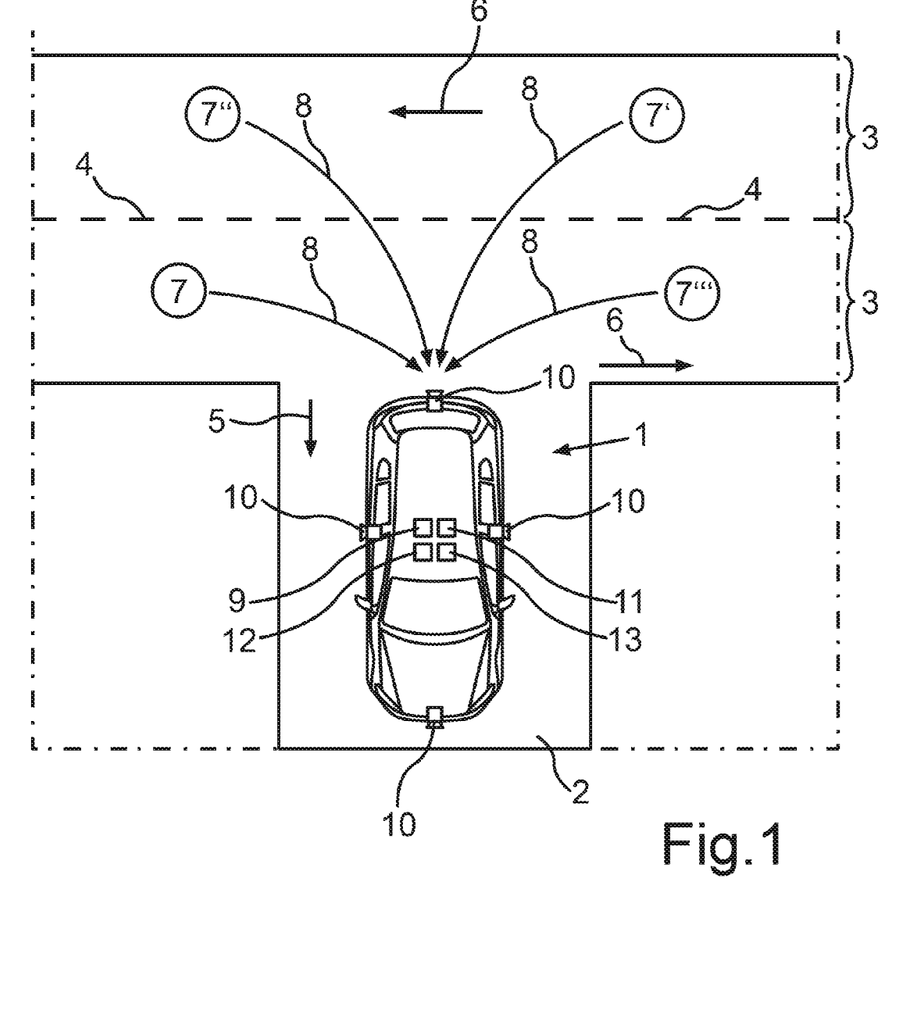
FIG. 1 shows a schematic representation of a transportation vehicle in a transverse parking space.

In FIG. 1 a transportation vehicle 1 is sketched that has been parked on a parking space 2 that is a transverse parking space. The parking space 2 is located at the edge of a road with two lanes 3, which are separated from each other by a lane marker 4. The transportation vehicle 1 comprises a control unit 9, an analysis unit 11, a memory unit 12, a communications interface 13 and four cameras 10. The cameras 10 are disposed in the front and rear regions and on the sides of the transportation vehicle 1.

The transportation vehicle 1 has been parked on the parking space 2 from one of four starting positionings 7, 7', 7'', 7'''. The corresponding parking routes 8 are sketched using arrows. The transportation vehicle orientation 5 on the parking space 2 is drawn using an arrow. The transportation vehicle 1 was parked in the forward direction onto the parking space 2 in this case. Assuming right traffic, i.e., with an indicated traffic direction 6, the starting positionings 7 and 7' are probable. In the case of the starting positionings 7'' and 7''', it is assumed therefrom that the two-lane road is a one-way road.

The starting positioning 7, 7', 7'', 7''' from which the transportation vehicle 1 and the transportation vehicle orientation 5 with which the transportation vehicle was parked on the parking space 2 are recorded using the cameras 10. Alternatively to cameras 10 as transportation vehicle 1 sensor devices, the detection of transportation vehicle surroundings data can also be carried out using radar units and/or lidar units of the transportation vehicle 1. Furthermore, the traffic direction 6 that is usual because of the corresponding country version of the transportation vehicle 1 is stored in the analysis unit 11. However, corresponding data stored in a navigation system of the transportation vehicle 1 can be accessed alternatively or additionally for determining the traffic direction 6.

Alternatively or additionally to the data of the surroundings of the transportation vehicle acquired by the cameras 10, which relate to the current parking situation of the transportation vehicle 1, surroundings data that are stored in the memory unit 12 of the transportation vehicle can be accessed. The stored data relating to the parking situation can, for example, have been recorded with the cameras 10 of the transportation vehicle 1 during the process of parking the transportation vehicle 1 or may have been acquired from data of a navigation system, such as, for example, from corresponding GPS data files.

Figure 2:
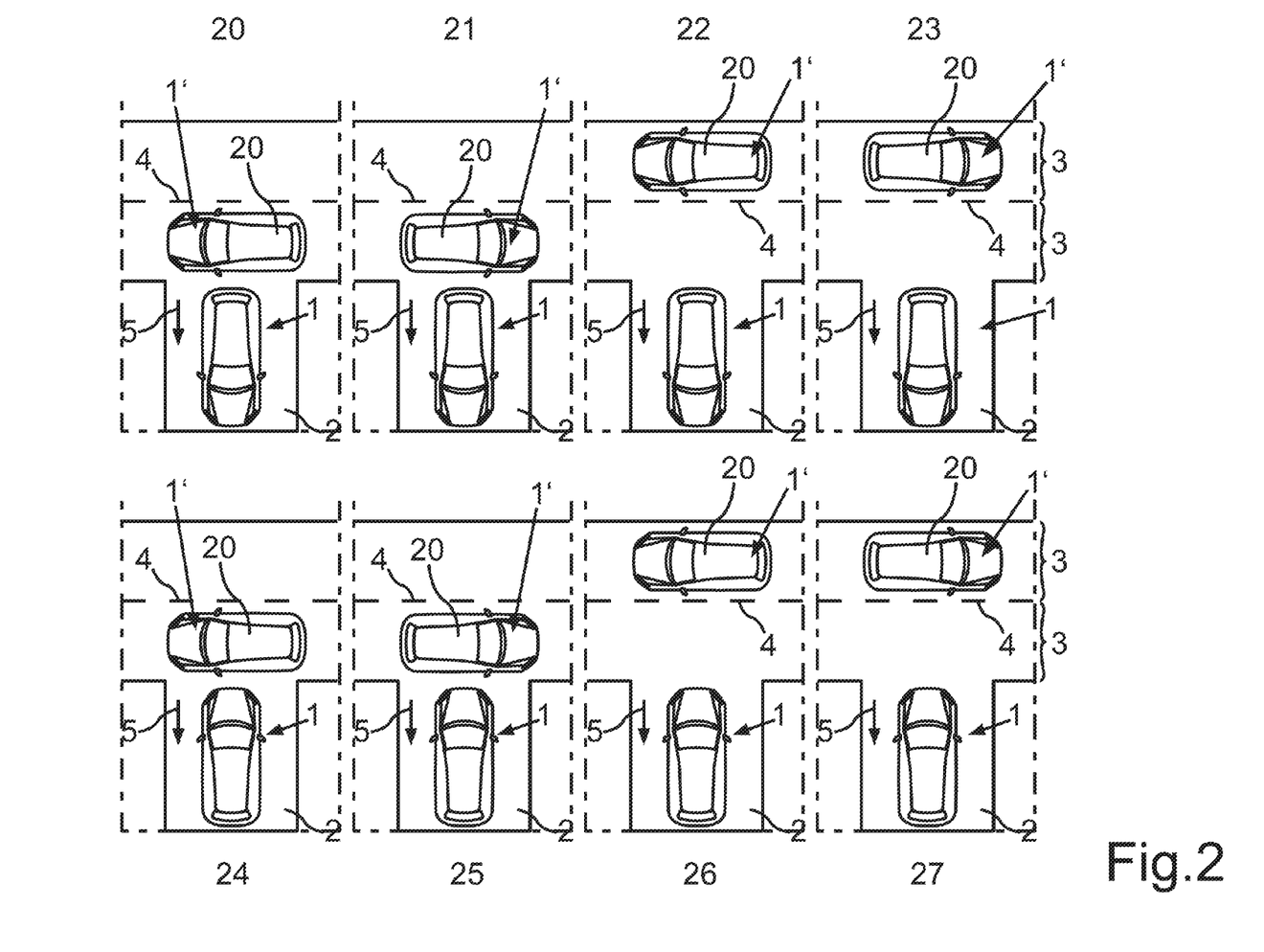
FIG. 2 shows a schematic representation of different possible target positionings of a transportation vehicle that is unparked out of a transverse parking space.

In FIG. 2, the different target positionings 20, 21, 22, 23, 24, 25, 26, 27 are sketched that the transportation vehicle 1 can adopt when unparking from the parking space 2. The transportation vehicles 1 that adopt the corresponding target positionings 20 through 27 are denoted as transportation vehicles 1' for this. First, two different transportation vehicle alignments 5 of the parked transportation vehicle 1 can be different in relation to the lane 3 here. The target positionings 20 through 23 each relate to a transportation vehicle 1 that was parked forwards into the parking space 2, whereas the target positionings 24 through 27 refer to a transportation vehicle 1 parked backwards onto the parking space 2. Both for a forwards and for a backwards parked transportation vehicle 1, in each case four different target positionings 20 through 23 or target positionings 24 through 27 result, which differ in terms of the starting positioning 7, 7', 7'', 7''' of the transportation vehicle 1. The starting positionings 7, 7', 7'', 7''' differ in terms of a starting orientation, i.e., as to whether the transportation vehicle 1 was parked from the left or right in relation to the parking space 2, and in terms of a starting position, which lies either on the lane side or on the opposite lane side of the road. In this case, the lane side refers to the lane 3 adjacent to the parking space 2, whereas the opposite lane side refers to the lane 3 that is not directly adjacent to the parking space 2.

Figure 3:
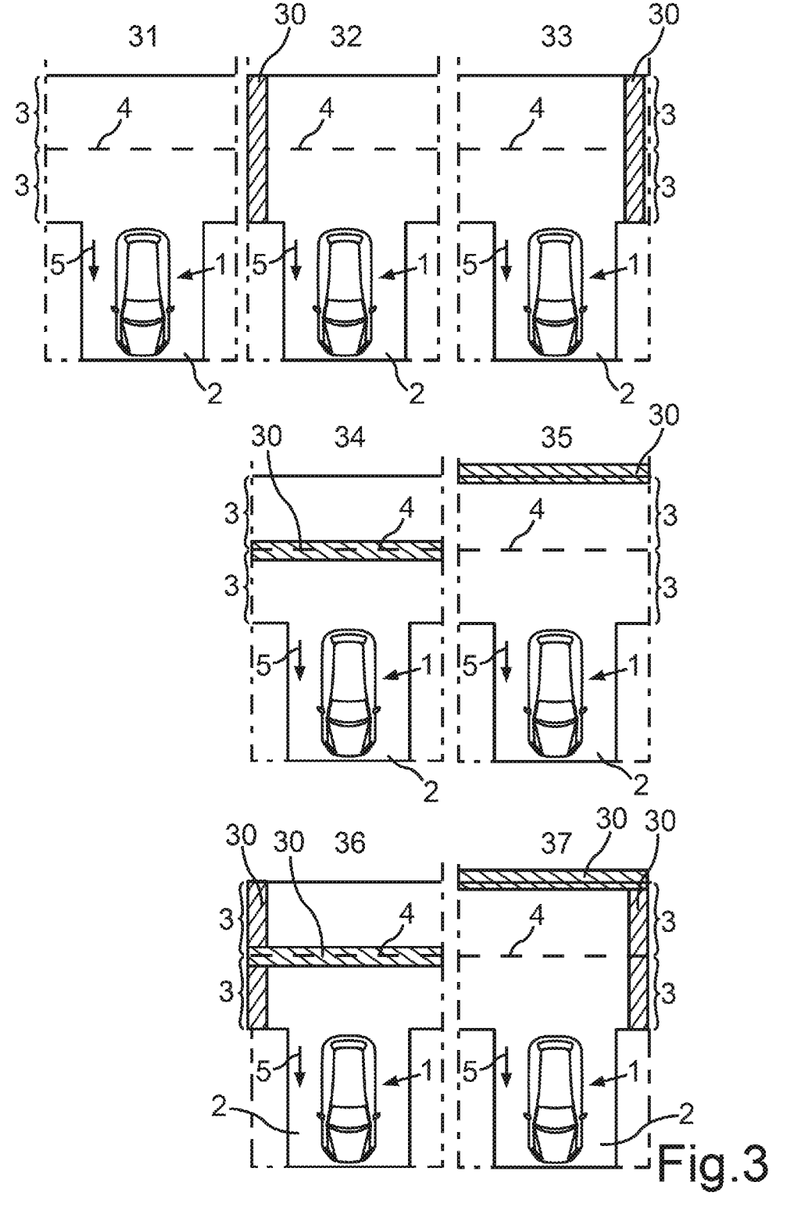
FIG. 3 shows a schematic representation of obstacles in the surroundings of a transportation vehicle parked in a transverse parking space.

In FIG. 3, a transportation vehicle 1 is again sketched that was parked forwards onto a parking space 2. However, there are various obstacles 30 disposed in the surroundings of the parking space 2 and thus in the surroundings of the transportation vehicle 1. In FIG. 3, seven different surroundings scenarios 31, 32, 33, 34, 35, 36, 37 with or without differently disposed obstacles 30 are sketched. The corresponding obstacles 30 are also detected using the cameras 10 of the transportation vehicle 1 or using corresponding data stored in the memory unit 12 and are present in the analysis unit 11. The obstacles 30 are then taken into account when determining the possible target positionings 20 through 27 and when determining the probability with which a respective target positioning 20 through 27 corresponds to a desired target positioning of a user 17 (see reference character 17 in FIG. 6) while taking into account the provided data relating to the transportation vehicle orientation 5, the starting positioning 7, 7', 7", 7''' and the traffic direction 6.

Figure 4:
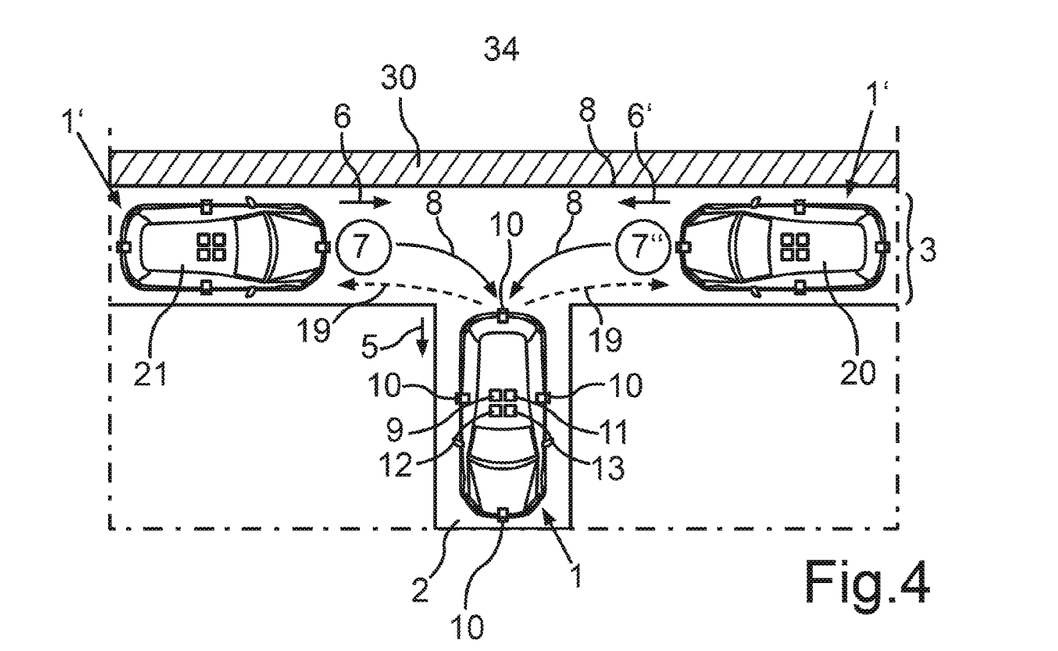
FIG. 4 shows a schematic representation of a selected parking and unparking situation of a transportation vehicle in a transverse parking space located on a single lane road bounded by an obstacle.

In FIG. 4 the surroundings scenario 34 is sketched, in which two target positionings 20 and 21 are possible. In FIG. 4 the parking space 2 is located on a road with an individual lane 3 bounded by an obstacle 30 lying parallel to the lane 3. The transportation vehicle 1 was previously parked in the forward direction on the parking space 2. Owing to the restriction of the lane 3 by the obstacle 30, only two starting positionings 7 and 7" are possible here. With one starting positioning 7, one traffic direction 6 is to be assumed, whereas in a starting positioning 7" the opposite traffic direction 6' is to be assumed. The lane 3 is thus a single-track road passable in only one direction. With the specified transportation vehicle orientation 5, the traffic direction 6 and the starting positioning 7, a target positioning 21 of the transportation vehicle 1' is thus to be assumed. The unparking route 19 leading to the target positioning 21 is also indicated in FIG. 4 as a dashed arrow. By contrast, for the stated transportation vehicle orientation 5, the traffic direction 6' and the starting positioning 7", only the target positioning 20 would be determined as a useful target positioning 20 through 27. In this surroundings scenario 34, there is thus only one possible target positioning 21 or 20 in each case for a known starting positioning 7 or 7". In this case, therefore, depending on the corresponding starting positioning 7 or 7" each of the two target positionings 21 and 20 is assessed with a probability of 1, i.e., with the highest possible probability, as the user's desired target positioning 17 of the transportation vehicle 1. The effect of this is that an automatic selection of the corresponding target positioning 20 or 21 is carried out and the transportation vehicle 1 is automatically or at least partly automatically driven to the selected target positioning 20 or 20'.

When determining the unparking route 19 itself, predetermined criteria are additionally taken into account in this case. The predetermined criteria are at least one of the following criteria, being a minimum number of movement and/or steering operations to reach the target positioning 20 or 21, a minimal distance covered until reaching the target positioning 20 or 21 and freeing up a minimum amount of free space in front of a driver's door of the transportation vehicle 1'.

Figure 5:
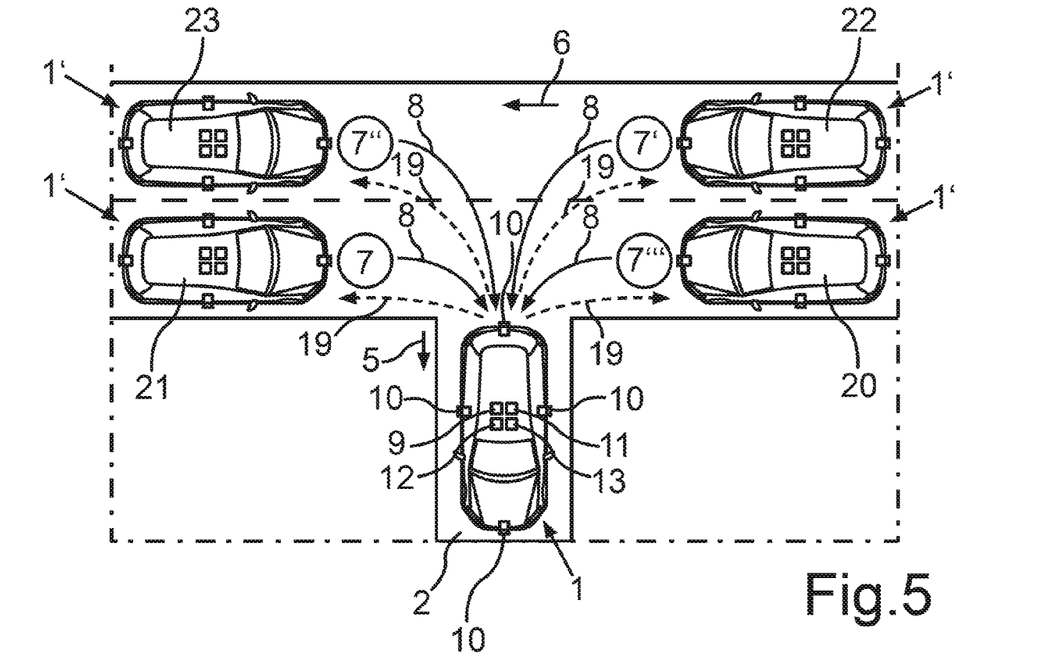
FIG. 5 shows a schematic representation of possible target positionings and starting positionings of a transportation vehicle that has been parked in a transverse parking space on a road.

In FIG. 5, the surroundings scenario 31 is sketched without an obstacle 30. In this surroundings scenario 31, all four starting positionings 7, 7', 7", 7''' are possible. Right traffic is assumed as the traffic direction 6 for this. The target positionings 20 through 23 that are possible because of the transportation vehicle orientation 5 are sketched again in FIG. 5 as transportation vehicles 1'. When taking into account the traffic direction 6, this gives the typical starting positionings 7 and 7". With the starting positioning 7, after parking on the parking space 2 the transportation vehicle 1 can either continue in the same direction of travel as previously or can turn around and thus travel in the opposite direction and thus with the opposite target orientation to the starting orientation. With the starting positioning 7, the two possible target positionings 21 and 22 thus result. With the starting positioning 7', the target positionings 22 and 21 similarly also result. However, relatively often the user 17 of the transportation vehicle 1 typically wants the transportation vehicle 1 to travel on in the same direction of travel after unparking in which it was already travelling before parking. Therefore, with a starting positioning 7, the target positioning 21 is occupied with a higher probability of, for example, 0.6 than the target positioning 22, which is occupied with a smaller probability of, for example, 0.4. It is therefore considered less probable that the user 17 of the transportation vehicle 1 wants to travel back in the direction from which the transportation vehicle 1 has previously come after unparking the transportation vehicle 1. Similarly, for the starting positioning 7' there is a higher probability for the target positioning 22 than for the target positioning 21. With the mentioned starting positionings 7 and 7', there is a probability of 0 for the other target positionings 23 and 20 in each case, because these target positionings 20, 23 are disposed opposite to the road system indicated by the traffic direction 6.

As with both starting positionings 7, 7', there are in each case two target positionings 21, 22 with different probabilities and further target positionings 23 and 20, each with a probability of 0, the target positioning with the highest probability is not automatically selected, but first a manual selection of the target positionings 20 through 23 by the user 17 of the transportation vehicle 1 is requested. For this the individual target positionings 20 through 23 are first ordered in a ranking in accordance with the probability thereof and the ranking is provided to the user 17 of the transportation vehicle 1 on a corresponding display. The display can, for example, be carried out on a mobile telephone 18 (see reference characters 18 in FIG. 6) or on a corresponding display in the interior of the transportation vehicle.

The ranking can be displayed as a list for this. With the starting positioning 7 this would produce the following list: target positioning 21, then target positioning 22 and then target positionings 20 and 23. The list thus starts with target positioning 20 through 27 with the highest probability and a target orientation of the transportation vehicle 1', which corresponds to the starting orientation of the transportation vehicle 1 before parking on the parking space 2. The user 17 can then manually select the first target positioning 21 either from the list by operating a corresponding control element on the mobile telephone 18 or the display surface in the interior of the transportation vehicle. If he does not want this target positioning 21, which is ranked as probable and correspondingly the user's 17 desired target positioning, the user 17 can select one of the other target positionings 22, 20 or 23 from the list.

Alternatively to the display of the ranking as a list of the target positionings 20 through 23, only the target positioning 21 with the highest determined probability and that corresponds to the target orientation the transportation vehicle 1' in accordance with the starting orientation of the transportation vehicle 1 before parking on the parking space 2 can be displayed to the user 17 of the transportation vehicle 1 on the corresponding display. Only by operating a corresponding element on the display surface can the user 17 cause the display of the further target positionings 22, 20 and 23 and select one of the alternative target positionings 22, 20 or 23 if he does not want the target positioning 21 determined as the most probable.

When determining the probability, in addition provided predetermined driving route criteria are taken into account. The driving route criteria contain information about a next possible destination of the transportation vehicle 1 after unparking. The driving route criteria can either be stored in a navigation system of the transportation vehicle 1, for example, because an upcoming next trip of the transportation vehicle 1 has already been stored there, or can be taken from a digital calendar of the user 17 of the transportation vehicle 1. A prerequisite for the latter is that the user 17 of the transportation vehicle 1 has stored his digital calendar in the analysis unit 11 or in the memory unit 12 of the transportation vehicle 1 and a data exchange between his digital calendar, which, for example, is stored in his mobile telephone 18, and the transportation vehicle 1 is enabled. Thus, for example, the analysis unit 11 can know that the user 17 has an appointment on a certain day at a defined time of day at a defined location. It is therefore assumed therefrom that after unparking the transportation vehicle 1 the user 17 wants to travel to the location of the corresponding appointment. The destination stored in this way in the transportation vehicle 1 is then taken into account when assessing the respective probability of the possible target positions 20 through 27 while taking into account the data relating to the current parking situation from the cameras 10 and taken from the memory unit 12, and the surroundings scenarios 31 through 37. It is also possible that destinations occurring again and again at defined times of day are stored in the memory unit 12 and the information is also taken into account when assessing the probabilities of the respective target positionings 20 through 27.

Figure 6:
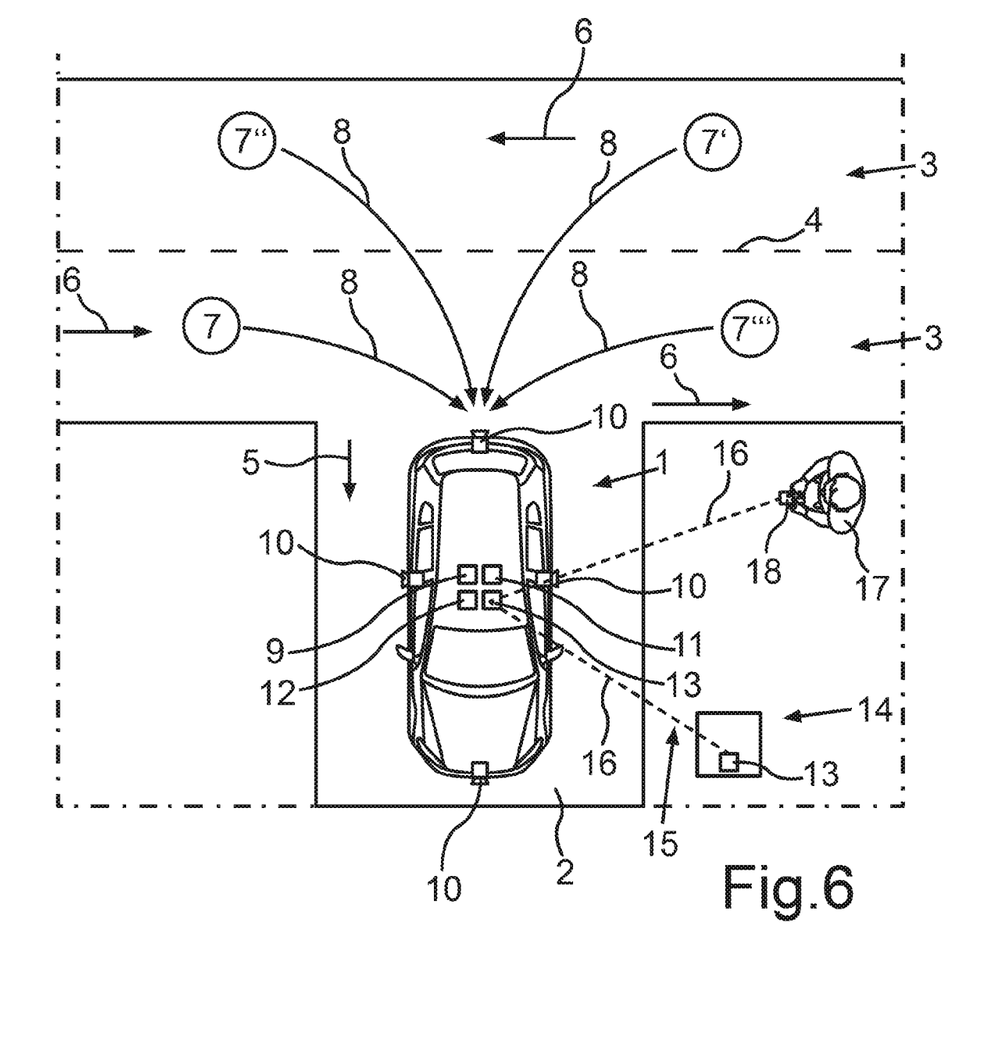
FIG. 6 shows a schematic representation of a transportation vehicle parked in a transverse parking space.

A parking situation of the transportation vehicle 1 on a parking space 2 that is part of an infrastructure facility is sketched In FIG. 6. The infrastructure facility, which is, for example, a car park, comprises an infrastructure unit 14 with an infrastructure camera 15 and a communications interface 13. Using the infrastructure camera 15, the data relating to the current parking situation of the transportation vehicle 1 are also provided using transportation vehicle surroundings data, which can be transmitted via a communications connection 16 to the communications interface 13 of the transportation vehicle 1. The transportation vehicle surroundings data can be taken into account in addition to the sensor data of the cameras 10 and/or the transportation vehicle surroundings data stored in the memory unit 12 when determining possible target positionings 20 through 27 of the transportation vehicle 1.

The user 17 of the transportation vehicle 1 with the mobile telephone 18 is also sketched in FIG. 6. Using a corresponding application, i.e., a corresponding mobile telephone app, this user 17 can determine the desired target positioning 20 through 27 of the transportation vehicle 1' while taking into account the starting positionings 7, 7', 7", 7''', the transportation vehicle orientation 5 and the traffic direction 6 even from a relatively large distance from the parking space 2, and can allow the transportation vehicle 1 to automatically unpark to the selected target positioning 20 through 27.

The scenarios described in the examples using FIGS. 1 through 6 were described exclusively for a transportation vehicle that was parked on the parking space 2 in the forward direction. Similarly, the opposite transportation vehicle orientation 5 in the case of a backwards parked transportation vehicle 1 is also possible. In this case, corresponding starting positionings 7, 7', 7", 7''' and corresponding target positionings 24 through 27 similarly result.

Figure 7:
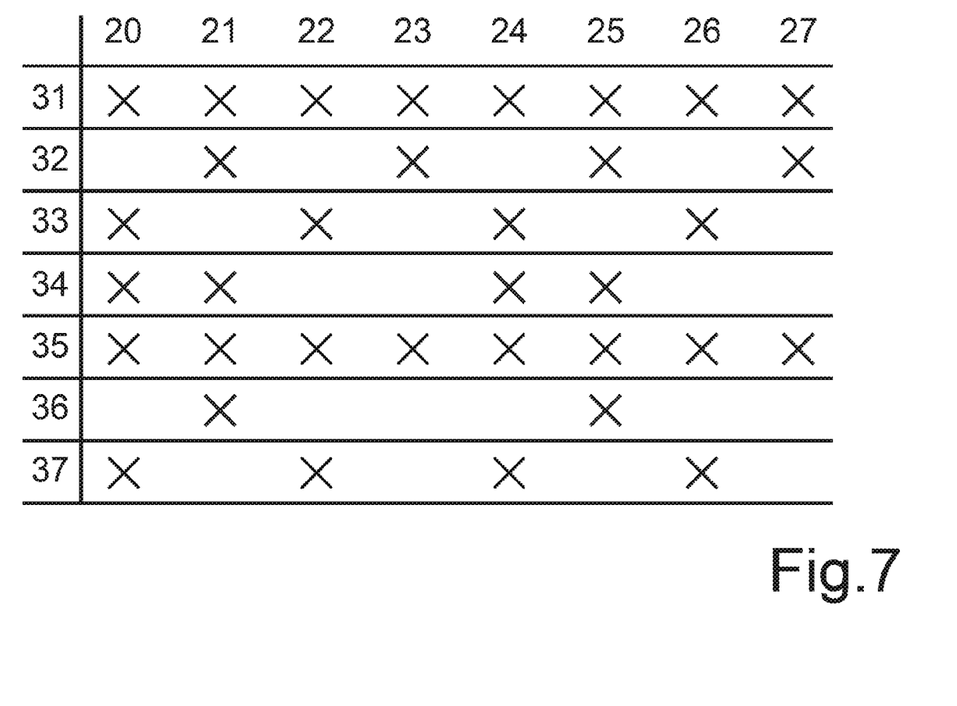
FIG. 7 shows a tabular representation of possible target positionings for different surroundings scenarios.

In FIG. 7 a table is represented, in which the possible target positionings 20 through 27 are stated depending on the surroundings scenarios 31 through 37. Depending on the surroundings scenario 31 through 37, thus different and different numbers of target positionings 20 through 27 are possible, wherein the individual target positionings 20 through 27 each differ in the probability thereof. The individual probabilities are in turn based on the data relating to the current parking situation and are thus determined using transportation vehicle surroundings data and, for example, using information about the destination of the transportation vehicle 1. The table thus provides a type of association list, from which the possible target positions 20 through 27 can be concluded for a defined surroundings scenario 31 through 37.

Overall, the examples show that with the described method for unparking the transportation vehicle 1 from the parking space 2, a user 17 of the transportation vehicle 1 can easily and rapidly select a desired target positioning 20 through 27. In doing so the respective probability of the individual target positionings 20 through 27 are determined for him while taking into account obstacles 30, i.e., while taking into account the surroundings scenarios 31 through 37, and based on sensor data of the cameras 10 and/or transportation vehicle surroundings data stored in the memory unit 12. Based on this probability with which a target positioning 20 through 27 corresponds to a desired target positioning of the user 17, either different classified target positionings 20 through 27 are offered to the user 17 for selection or the one single possible target positioning 20 through 27 is determined, to which the transportation vehicle 1 is automatically unparked from the parking space 2.

REFERENCE CHARACTER LIST 1 transportation vehicle
2 parking space
3 lane
4 lane marker
5 transportation vehicle orientation
6, 6' traffic direction
7, 7', 7", 7''' starting positioning
8 parking route
9 control unit
10 camera
11 analysis unit
12 memory unit
13 communications interface
14 infrastructure unit
15 infrastructure camera
16 communications connection
17 user
18 mobile telephone
19 unparking route
20, 21, 22, 23, 24, 25, 26, 27 target positioning
30 obstacle
31, 32, 33, 34, 35, 36, 37 surroundings scenario

The invention claimed is:

1. A transportation vehicle comprising:
a control unit to control the transportation vehicle at least partly autonomously, wherein the transportation vehicle performs a method for unparking a transportation vehicle from a parking space, wherein the control unit controls the transportation vehicle at least partly autonomously by:

providing data relating to a current parking situation, the provided data including at least a parked orientation of the transportation vehicle, a starting positioning from which the transportation vehicle was previously parked on the parking space, a traffic direction on a lane adjacent to the parking space, and vehicles surroundings data, wherein the parked orientation is determined by estimating a position of the transportation vehicle based, at least in part, on odometry data that indicates an orientation of the transportation vehicle relative to the lane adjacent to the parking space;

determining possible target positionings of the transportation vehicle based on the provided data, the possible target positionings being positionings permissible to the transportation vehicle given the vehicle surroundings data;

determining, based on the provided data and for each possible target positioning, a probability with which the respective possible target positioning corresponds to a target positioning a user of the transportation vehicle is likely to select;

ordering the target positionings in a ranking according to the probability thereof; and unparking the transportation vehicle along an unparking route leading to one of the possible target positionings based on predetermined criteria and on the ranking of the possible target positionings.

2. A method for unparking a transportation vehicle from a parking space, wherein the transportation vehicle comprises a control unit to control the transportation vehicle at least partly autonomously, the method comprising:

providing data relating to a current parking situation, the provided data including at least a parked orientation of the transportation vehicle, a starting positioning from which the transportation vehicle was previously parked on the parking space, a traffic direction on a lane adjacent to the parking space, and vehicle surroundings data, wherein the parked orientation is determined by estimating a position of the transportation vehicle based, at least in part, on odometry data that indicates an orientation of the transportation vehicle relative to the lane adjacent to the parking space;

determining possible target positionings of the transportation vehicle based on the provided data, the possible target positionings indicating positionings permissible to the transportation vehicle given the vehicle surroundings data;

determining, based on the provided data and for each possible target positioning, a probability with which the respective target positioning corresponds to a target positioning a user of the transportation vehicle is likely to select;

ordering the target positionings in a ranking according to the probability thereof; and unparking the transportation vehicle along an unparking route leading to one of the target positionings based on predetermined criteria and on the ranking of the target positionings.

3. The method of claim 2, wherein the vehicle surroundings data is sensed by sensor units of the transportation vehicle and/or have been stored in a memory unit of the transportation vehicle.

4. The method of claim 2, wherein the probability is further determined based on data relating to provided predetermined driving route criteria, the data relating to the provided predetermined driving route criteria containing information about a destination of the transportation vehicle after unparking and provided by at least one of the following systems:

a navigation system of the transportation vehicle,
a digital calendar of the user of the transportation vehicle.

5. The method of claim 2, wherein the predetermined criteria taken into account for determining the unparking route include at least one of the following criteria:

a minimum number of movement and/or steering operations to reach the target positioning,
a minimum distance covered until reaching the target positioning,
leaving a minimum amount of free space in front of a driver's door of the transportation vehicle.

6. The method of claim 2, further comprising displaying at least one possible target positioning on a mobile telephone of the user of the transportation vehicle and/or on a display surface in the interior of the transportation vehicle.

7. The method of claim 6, wherein the ranking is displayed as a list of all possible target positionings in response to a plurality of target positionings being determined as possible target positionings, wherein the list starts with the target positioning with the highest probability and a target orientation of the transportation vehicle corresponding to a starting orientation of the transportation vehicle before parking on the parking space, and the user is requested to manually select one of the possible target positionings from the displayed list, whereupon the transportation vehicle is unparked while controlled by the control unit along the unparking route leading to the selected target positioning and defined based on the predetermined criteria.

8. The method of claim 6, wherein only the target positioning with the highest probability and a target orientation of the transportation vehicle corresponding to a starting orientation of the transportation vehicle before parking on the parking space is displayed to the user and the user is required to manually select the displayed target positioning in response to a plurality of target positionings having been determined as possible target positioning, whereupon the transportation vehicle, while controlled by the control unit, is unparked along the unparking route leading to the selected target positioning and defined based on the predetermined criteria.

9. The method of claim 8, further comprising displaying further target positionings with lower probabilities manually in response to selection of a corresponding element on the display surface, whereupon the user manually chooses between all possible target positionings.

10. The transportation vehicle of claim 1, wherein the data relating to the current parking situation are provided using transportation vehicle surroundings data, which are sensed by sensor units of the transportation vehicle and/or have been stored in a memory unit of the transportation vehicle.

11. The transportation vehicle of claim 1, wherein the probability is further determined based on data relating to provided predetermined driving route criteria, the data relating to the provided predetermined driving route criteria containing information about a destination of the transportation vehicle after unparking and provided by at least one of the following systems:

a navigation system of the transportation vehicle,
a digital calendar of the user of the transportation vehicle.

12. The transportation vehicle of claim 1, wherein the predetermined criteria taken into account for determining the unparking route include at least one of the following criteria:
- a minimum number of movement and/or steering operations to reach the target positioning,
- a minimum distance covered until reaching the target positioning,
- leaving a minimum amount of free space in front of a driver's door of the transportation vehicle.

13. The transportation vehicle of claim 1, wherein providing of the ranking displays at least one possible target positioning on a mobile telephone of the user of the transportation vehicle and/or on a display surface in the interior of the transportation vehicle.

14. The transportation vehicle of claim 13, wherein the ranking is displayed as a list of all possible target positionings in response to a plurality of target positionings being determined as possible target positionings, wherein the list starts with the target positioning with the highest probability and a target orientation of the transportation vehicle corresponding to a starting orientation of the transportation vehicle before parking on the parking space, and the user is requested to manually select one of the target positionings from the displayed list, whereupon the transportation vehicle is unparked while controlled by the control unit along the unparking route leading to the selected target positioning and defined based on the predetermined criteria.

15. The transportation vehicle of claim 13, wherein only the target positioning with the highest probability and a target orientation of the transportation vehicle corresponding to a starting orientation of the transportation vehicle before parking on the parking space is displayed to the user and the user is required to manually select the displayed target positioning in response to a plurality of target positionings having been determined as a possible target positioning, whereupon the transportation vehicle, while controlled by the control unit, is unparked along the unparking route leading to the selected target positioning and defined based on the predetermined criteria.

16. The transportation vehicle of claim 15, wherein further target positionings with lower probabilities are displayed carried out manually in response to selection of a corresponding element on the display surface, whereupon the user manually chooses between all possible target positionings.

* * * * *